United States Patent
Nakano

(10) Patent No.: US 6,674,909 B1
(45) Date of Patent: Jan. 6, 2004

(54) MPEG DATA PROCESSING APPARATUS COMPRISING AN ARRANGEMENT FOR ESTIMATING AN INTERVAL BETWEEN PARTICULAR PICTURE DATA

(75) Inventor: Hirotaka Nakano, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/547,198

(22) Filed: Apr. 12, 2000

(30) Foreign Application Priority Data

Apr. 13, 1999 (JP) .......................................... 11-105658

(51) Int. Cl.[7] ................................................. G06K 9/36
(52) U.S. Cl. ....................................................... 382/236
(58) Field of Search ................................. 382/232, 233, 382/236, 238, 240, 242, 248, 250; 348/384.1, 394.1, 395.1, 400.1–404.1, 407.1–416.1, 420.1, 421.1, 425.2, 430.1, 431.1; 375/240.02, 240.03, 240.12–240.16, 240.18, 240.2, 240.22–240.25

(56) References Cited

U.S. PATENT DOCUMENTS

| | | | | |
|---|---|---|---|---|
| 5,146,325 A | * | 9/1992 | Ng | 348/384.1 |
| 5,212,549 A | * | 5/1993 | Ng et al. | 375/240.15 |
| 5,610,841 A | * | 3/1997 | Tanaka et al. | 725/115 |
| 6,282,240 B1 | * | 8/2001 | Fukunaga et al. | 375/240.01 |

FOREIGN PATENT DOCUMENTS

| | | |
|---|---|---|
| GB | 2308264 | 6/1997 |
| JP | 6-276485 | 9/1994 |
| JP | 7-226918 | 8/1995 |
| JP | 8-195934 | 7/1996 |
| JP | 9-200695 | 7/1997 |
| JP | 10-42255 | 2/1998 |
| JP | 10-66021 | 3/1998 |
| JP | 2773594 | 4/1998 |

OTHER PUBLICATIONS

Japanese Office Action dated May 22, 2002 (w/English translation of relevant portions).

* cited by examiner

*Primary Examiner*—Jose L. Couso
(74) *Attorney, Agent, or Firm*—Dickstein, Shapiro, Morin & Oshinsky, LLP.

(57) ABSTRACT

In an MPEG data processing apparatus comprising a particular picture searching section which comprises a particular picture detector for detecting a current particular picture datum in MPEG video data, a particular picture interval holding section holds, as an estimated interval, an interval between the current particular picture datum and a predicted next particular picture. A next particular picture address calculating section calculates the predicted next particular picture on the basis of the estimated interval and a current address on reception of the estimated interval to produce the estimated address as a calculated address. A address controller accesses a memory at the calculated address to make the memory read a datum for the calculated address in a buffer.

13 Claims, 6 Drawing Sheets

SEQUENCE LAYER

SH: SEQUENCE HEADER
GOP: GROUP OF PICTURES

GOP LAYER

MPEG DATA PROCESSING APPARATUS COMPRISING AN ARRANGEMENT FOR ESTIMATING AN INTERVAL BETWEEN PARTICULAR PICTURE DATA

BACKGROUND OF THE INVENTION

This invention relates to a moving picture coding experts group (MPEG) data processing apparatus for processing MPEG video data at a high speed.

As is well known in the art, MPEG is a picture information compressive coding technique for a digital video signal. MPEG codes the digital video signal into a coded digital video signal which is called MPEG video data. The MPEG video data are classified into three types, namely, intra coded picture data, predictive coded picture data, and bidirectionally predictive picture data. Each of the intra coded picture data indicates an intra coded picture which is called an I-picture for short. Each of the predictive coded picture data indicates a predictive coded picture which is called a P-picture for short. Each of the bidirectionally predictive picture data indicates a bidirectionally predictive picture which is called a B-picture for short.

The I-picture datum is generated without use of interframe prediction. The P-picture datum is generated by carrying out prediction on a previous I-picture datum or a previous P-picture datum. The B-picture datum is generated by carrying out prediction on, two fore and aft picture data each of which is the I-picture datum or the P-picture datum.

In picture reproduction, in a case of carrying out a fast feed or the like, in order to processing the MPEG video data at a high-speed, a method comprising the steps of decoding only the I-picture data and the P-picture data and of skipping the B-picture data is used.

In the above-mentioned case, it is desirable to shorten a processing time as far as possible. However, intervals between the I-picture data or the P-picture data are not constant in the MPEG video data because information compressive rates for respective frames are different from each other. As a result, a conventional MPEG data processing apparatus sequentially reads all of the MPEG video data in order to skip the B-picture data even a case where only the I-picture data or the P-picture data are necessitated in the manner which will later become clear.

In addition, various preceding arts related to the present invention are already known. By way of example, UK Patent Publication No. GB 2308264 discloses an MPEG video disk recording system for high-speed reproduction. According to GB 2308264, a disk for high-speed reproduction contains position information of successive I-pictures in a recording area of a present I-picture. Using the above disk, a predetermined waiting time is set in a timer based on a selected multiple speed when moving image data is reproduced at high speed. Referring to the position information of the I-pictures read from the disk, a pickup is moved to the position of the following I-picture to then be reproduced. The data is reproduced at the moved position if the waiting time given by the timer is reached. A larger amount of image information is used within a given time according to each selected multiple speed in order to realize a high-speed reproduction operation with a more natural image displayed.

Japanese Unexamined Patent Publication of Tokkai No. Hei 9-200,695 or JP-A 9-200695 discloses a method and apparatus for decoding video data for high-speed reproduction. According to JP-A 9-200695, picture size items are set in user data in a picture to restrict a coded size of the picture in question. Inasmuch as I-pictures, P-pictures, and B-pictures in MPEG video data are coded in variable length, the coded size of the picture is extremely variable in accordance with complexity of the picture, brightness, and correlation relationship between fore and aft pictures. By doing such as this, although all of data are not searched for a picture start point of a following picture by reading all of data and by comparing picture-start-codes, the coded size of the picture is recognized, it is possible to rapidly shift to the start point of the fore and aft pictures, and it is possible to skip picture data.

Japanese Unexamined Patent Publication of Tokkai No. Hei 10-66,021 or JP-A 10-66021 discloses "METHOD FOR RECORDING COMPRESSED PICTURE DATA", to effectively execute specific reproduction such as high speed reproduction without increasing the recording data volume by dividing digital compressed picture data into a plurality of areas in accordance with a picture sort, recording the divided data in a recording medium and selectively reproducing data in each area. According to JP-A 10-66021, an area division block divides generated digital compressed picture data into an area including I pictures and an area including P and B pictures and records the divided data in a recording medium through a record processing block. The digital compressed picture data recorded in the medium are read out by a reading processing block, extended by an extending processing block and D/A converted by a D/A conversion circuit and the analog data are outputted as a reproduced signal. In this case, high speed reproduction such as quick feeding, reverse rotation and index reproduction can be attained by continuously reading out only I pictures in one area.

Japanese Unexamined Patent Publication of Tokkai No. Hei 10-42,255 or JP-A 10-42255 discloses "MOVING PICTURE RECORDING DEVICE, RECORDING MEDIUM AND MOVING PICTURE REPRODUCING DEVICE" to efficiently reproduce only a specified frame by detecting a specified frame from an encoded picture data string and recording the position of the detected frame on a recording medium. According to JP-A 10-42255, a reference frame detection circuit retrieves the position of a header code showing the start of a reference frame arranged in the inputted data string. A table generation circuit generates a reference table indicating a positional relationship in the data string of the reference frame based on the start position of the reference frame which is detected in the reference frame detection circuit. A recording conversion circuit converts an input data string and recording conversion circuit the reference table into forms where they can be recorded in the recording medium. A recording control circuit executes control required for the recording of the recording medium. When reference frame information recorded in the table is referred to and data is skipped and reproduced at the reproduction, high speed reproduction is possible. When data is skipped and reproduced by skipping one piece, the two-fold reproduction of high speed reproduction is possible.

Japanese Patent Publication No. 2773594 or JP-B 2773594 discloses "METHOD FOR REPRODUCING FAST FEED PICTURE AND FAST RETURNED PICTURE FROM MOTION PICTURE INFORMATION SUBJECT TO HIGH EFFICIENCY CODING" to obtain a reproduced picture with a smooth motion from motion picture information subject to high efficiency coding at the timer of reproduction of fast feed picture and fast returned picture. According to JP-B 2773594, when a picture of only I frame is selected and reproduced from a bit stream in which I, P, B frames or the like are in existence in mixture and a fast feed/fast returned picture is reproduced, the average interval between I mutual frames arranged in the bit stream is arranged so as to be a predetermined interval by which an interval of displayed pictures is made constant, and the retrieval of an I frame to be reproduced succeedingly to the reproduced I frame is started from a position resulting from subtracting a predetermined value K from an integer multiple of the predetermined interval in the case of reproduction of a fast feed picture and the retrieval of an I frame to be reproduced succeedingly to the reproduced I frame is started from a position resulting from adding a predetermined value M to an integer multiple of the predetermined interval in the case of reproduction of a fast returned picture. Thus, a time required to detect an object I frame is reduced, number of reproduced pictures per unit time is increased and a reproduced picture with smooth motion is easily obtained.

Although the above-mentioned publications are related to this invention, each of the above-mentioned publications merely discloses a technical idea which is quite different from this invention. That is, GB 2308264 merely discloses the MPEG video disk for high-speed reproduction which must contain position information of successive I-pictures in a recording area of a present I-picture. In addition, JP-A 9-200695 merely discloses a technical idea in which a picture must store picture size information. Furthermore, JP-A 10-66021 merely discloses a technical idea in which digital compressed picture data are recorded in a recording medium with the digital compressed picture data divided into an area including I pictures and an area including P and B pictures. JP-A 10-42255 merely discloses a technical idea in which information for specifying a position of a reference frame (specified frame) in a picture data string is recorded in a recording medium. In addition, JP-B 2773594 merely discloses a technical idea in which the average interval between I mutual frames arranged in the bit stream is arranged so as to be a predetermined interval by which an interval of displayed pictures is made constant.

SUMMARY OF THE INVENTION

It is therefore an object of this invention to provide an MPEG data processing apparatus, which is capable of processing an MPEG video,data at a high-speed.

Other objects of this invention will become clear as the description proceeds.

On describing the gist of an aspect of this invention, it is possible to be understood that a moving picture coding experts group (MPEG) data processing apparatus successively extracts, as extracted picture data, particular picture data from MPEG video data to obtain original picture data from the extracted picture data. According to the above-mentioned aspect of this invention, the above-understood MPEG data processing apparatus comprises a first arrangement for detecting a current particular picture datum in the MPEG video data to obtain a detected result. The first arrangement estimates, as an estimated interval, an interval between the current particular picture datum and a predicted next particular picture datum in accordance with the detected result. Connected to the first arrangement, a second arrangement extracts, as a predicted one of the extracted picture data, the predicted next particular picture datum in accordance with the estimated interval.

On describing the gist of another aspect of this invention, it is possible to be understood that a particular picture searching section searches moving picture coding experts group (MPEG) video data for particular picture data. According to the afore-mentioned aspect of this invention, the above-understood particular picture searching section comprises a first arrangement for detecting a current particular picture datum in the MPEG video data to obtain a detected result. The first arrangement estimates, as an estimated interval, an interval between the current particular picture datum and a predicted next particular picture datum in accordance with said detected result. Connected to the first arrangement, a second arrangement extracts, as a predicted one of the particular picture data, the predicted next particular picture datum in accordance with the estimated interval.

On describing the gist of still another aspect of this invention, it is possible to be understood that a searching method successively searches moving picture coding experts group (MPEG) video data for particular picture data. According to the above-mentioned aspect of this invention, the above-understood method comprises the steps of estimating, as an estimated particular picture interval, a next particular picture interval between a current particular picture datum and a predicted next particular picture datum using a past particular picture interval between the current particular picture datum and a previous particular picture datum, and of extracting the predicted next particular picture datum from the MPEG video data on the basis of the estimated particular picture interval.

DESCRIPTION OF THE PREFERRED EMBODIMENT

Figure 1:
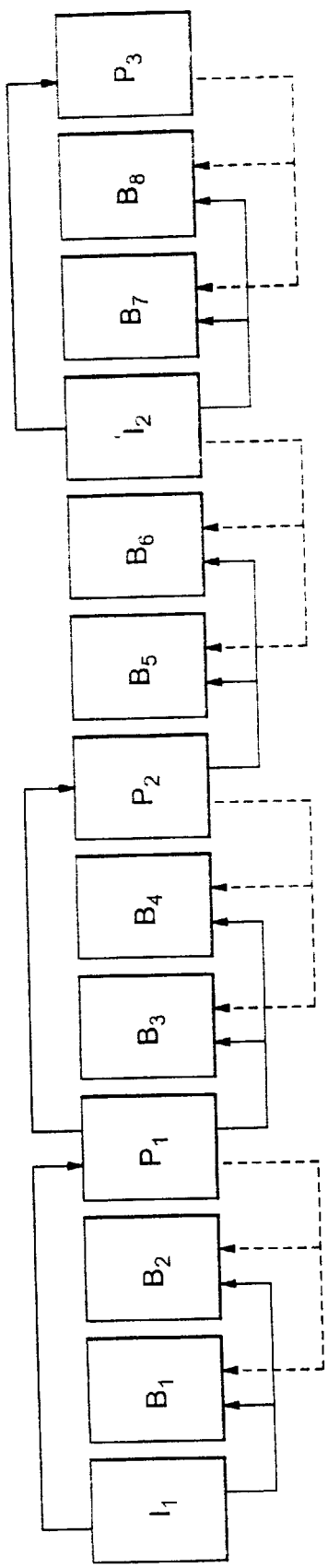
FIG. 1 is a view showing mutual relationship among I-picture data, P-picture data, and B-picture data in MPEG vide data.

Referring to FIG. 1, description will proceed to mutual relationship among I-picture data, P-picture data, and B-pictures data in MPED video data. The illustrated MPEG video data comprises a first I-picture datum $I_1$, first and second B-picture data $B_1$ and $B_2$, a first P-picture datum $P_1$, third and fourth B-picture data $B_3$ and $B_4$, a second P-picture datum $P_2$, fifth and sixth B-picture data $B_5$ and $B_6$, a second I-picture datum $I_2$, seventh and eighth B-picture data $B_7$ and $B_8$, and a third P-picture datum $P_3$ in this order.

The first I-picture datum $I_1$ represents a first I-picture coded in a frame thereof. The first P-picture datum $P_1$ represents a first P-picture coded by motion-compensated prediction using the first I-picture datum $I_1$. The first and the second B-picture data $B_1$ and $B_2$ represent first and second B-pictures each of which is coded by motion-compensated prediction using the first I-picture datum $I_1$ and the first P-picture datum $P_1$. The second P-picture datum $P_2$ represents a second P-picture coded by motion-compensated prediction using the first P-picture datum $P_1$. The third and the fourth B-picture data $B_3$ and $B_4$ represent third and fourth B-pictures each of which is coded by motion-compensated prediction using the first and the second P-picture data $P_1$ and $P_2$.

Likewise, the second I-picture datum $I_2$ represents a second I-picture coded in a frame thereof. The fifth and the sixth B-picture data $B_5$ and $B_6$ represent fifth and sixth B-pictures each of which is coded by motion-compensated prediction using the second P-picture datum $P_2$ and the second I-picture datum $I_2$. The third P-picture datum $P_3$ represents a third P-picture coded by motion-compensated prediction using the second I-picture datum $I_2$. The seventh and the eighth B-picture data $B_7$ and $B_8$ represent seventh and eighth B-pictures each of which is coded by motion-compensated prediction using the second I-picture datum $I_2$ and the third P-picture datum $P_3$.

Figure 2A:
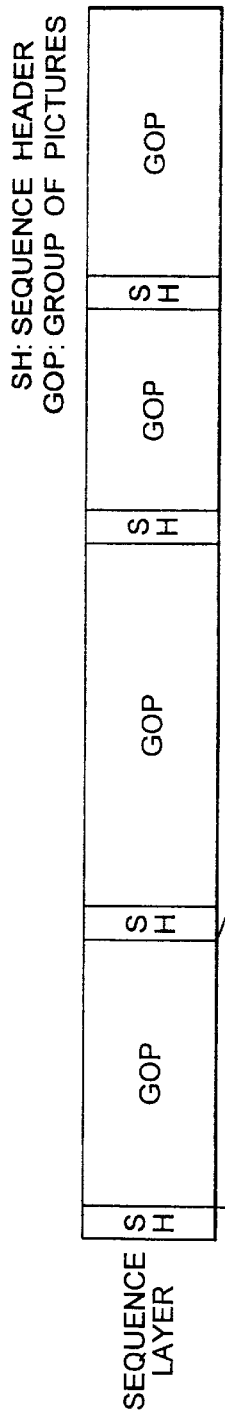
FIGS. 2A and 2B show a sequence layer and a GOP layer in the MPEG video data.
Figure 2B:
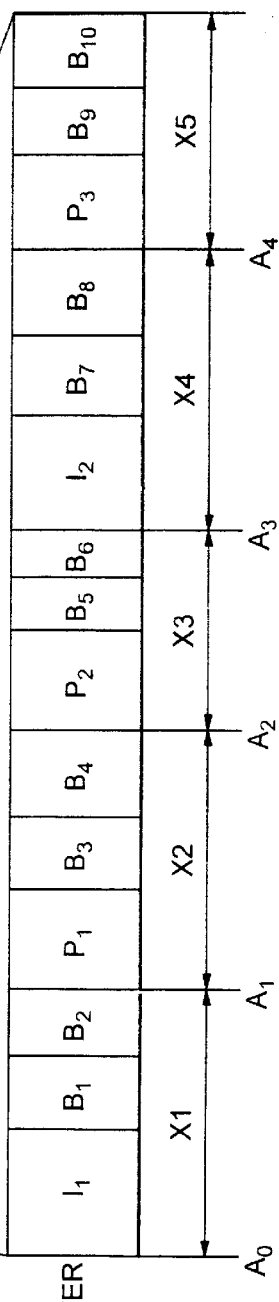

Turning to. FIGS. 2A and 2B, the MPEG video data have a layer structure. FIGS. 2A and 2B represent a sequence layer and a group of pictures (GOP) layer in the MPEG video data, respectively.

As shown in FIG. 2A, the sequence layer comprises a plurality of sequence headers (SH) and a plurality of GOPs. As shown in FIG. 2B, the GOP layer comprises a plurality of I-picture data, a plurality of P-picture data, and a plurality of B-picture data. The GOP illustrated in. FIG. 2B, the GOP comprises a first I-picture datum $I_1$, first and second B-picture data $B_1$ and $B_2$, a first P-picture datum $P_1$, third and fourth B-picture data $B_3$ and $B_4$, a second P-picture datum $P_2$, fifth and sixth B-picture data $B_5$ and $B_6$, a second I-picture datum $I_2$, seventh and eighth B-picture data $B_7$ and $B_8$, a third P-picture datum $P_3$, and ninth and tenth B-picture data $B_9$ and $B_{10}$.

In picture reproduction, in a case of carrying out a fast feed or the like, in order to process the MPEG video data at a high-speed, a method comprising the steps of decoding only the I-pictures and the P-pictures and of skipping the B-pictures is used. In this case, it is desirable to shorten a processing time as far as possible.

However, as illustrated in FIG. 2B, first through fifth intervals X1, X2, X3, X4, and X5 between the I-pictures or the P-pictures are not constant in the MPEG video data because information compressive rates for respective frames are different from each other. The first interval X1 is an interval between a leading edge of the first I-picture datum $I_1$ and a leading edge of the first P-picture datum $P_1$. The second interval X2 is an interval between the leading edge of the first P-picture datum $P_1$ and a leading edge of the second P-picture datum $P_2$. The third interval X3 is an interval between the leading edge of the second P-picture datum $P_2$ and a leading edge of the second I-picture datum $I_2$. The fourth interval X4 is an interval between the leading edge of the second I-picture datum $I_2$ and a leading edge of the third I-picture datum $P_3$. The fifth interval X5 is an interval between the leading edge of the third P-picture datum $P_3$ and a trailing edge of the tenth B-picture datum $B_{10}$.

As a result, a conventional MPEG data processing apparatus must sequentially read all of the MPEG video data even a case where only the I-pictures or the P-pictures are necessitated, as mentioned in the preamble of the instant specification.

Figure 3:
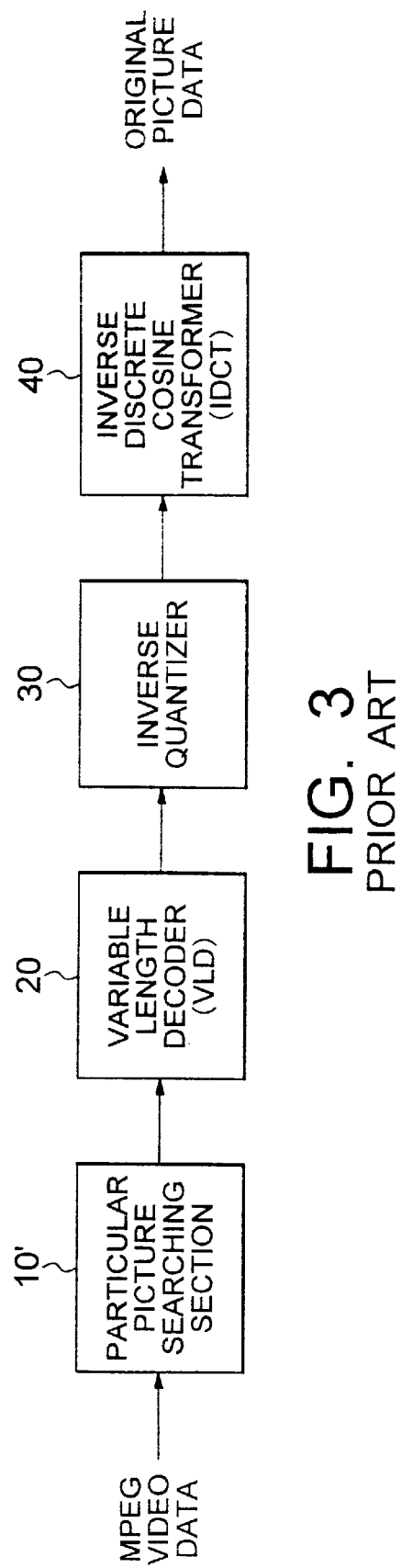
FIG. 3 is a block diagram of a conventional MPEG data processing apparatus.

Referring to FIG. 3, the description will proceed to a conventional decode processing apparatus for the MPEG video data in order to facilitate an understanding of the present invention. The illustrated decode processing apparatus is called an MPEG data processing apparatus and comprises a conventional particular picture searching section 10', a variable length decoder (VLD) 20, an inverse quantizer 30, and an inverse discrete cosine transformer (IDCT) 40.

The particular picture searching section 10' is supplied with the MPEG video data. The particular picture searching section 10' searches the MPEG video data for the I-picture data and the P-picture data to produce, as extracted data, the I-picture data and the P-picture data. The extracted data are supplied to the variable length decoder 20. The variable length decoder 20 decodes the extracted data with the variable length to produce a decoded data. The decoded data are supplied to the inverse quantizer 30. The inverse quantizer 30 carries out inverse quantization operation on the decoded data to produce inverse quantized data. The inverse quantized data are supplied to the inverse discrete cosine transformer 40. The inverse discrete cosine transformer 40 transforms the inverse quantized data from a frequency region to a spatial region to produce original picture data.

Figure 4:
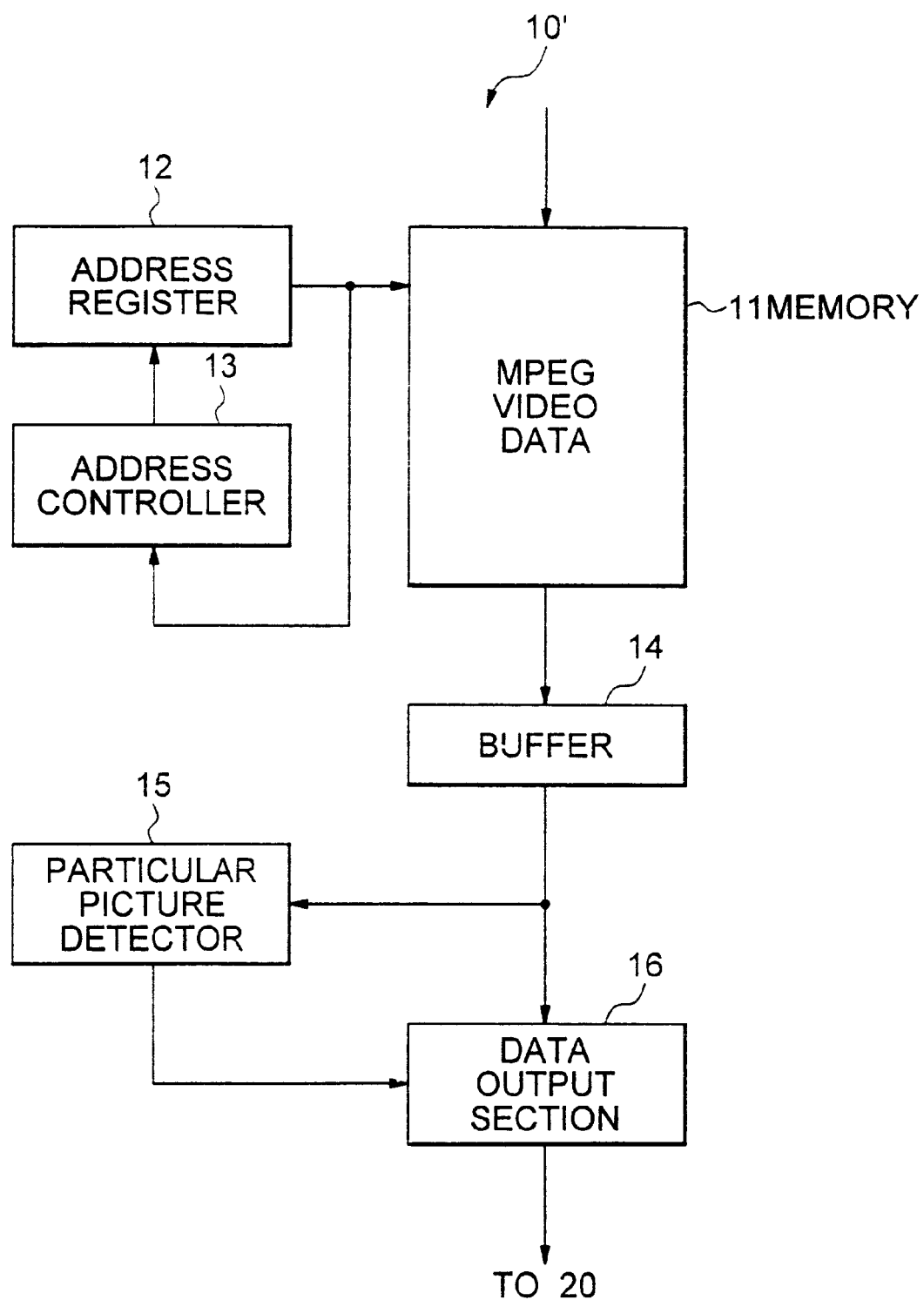
FIG. 4 is a block diagram of a conventional particular picture searching section for use in the MPEG data processing apparatus illustrated in FIG. 3.

Turning to FIG. 4, the description will proceed to a conventional particular picture searching section 10'. The particular picture searching section 10' comprises a memory 11 for storing the MPEG video data, an address register 12 for holding an address for the memory 11, an address controller 13 for controlling the address register 12, a buffer 14 for holding data read out of the memory 11, a particular picture detector 15 for detecting the particular picture data in the MPEG video data, and a data output section 16 for outputting the particular picture data.

For example, the memory 11 stores the MPEG video data of the sequence layer as illustrated in FIG. 2A in the order from the left to the right. The memory 11 may store the GOP layer as illustrated in FIG. 2B in the order from the left to the right. In the example being illustrated, the MPEG video data are stored in the memory 11 in four of bytes or in thirty-two bits.

The address register 12 holds a current address for the memory 11 to read one of the MPEG video data from the memory 11 to the buffer 14 as a read datum of 32 bits long.

In the manner known in the art, the I-picture data, the P-picture data, and the B-picture data are identified by using a bit pattern of three bits long that is called a picture coding type (PCT). Each I-picture datum has the PCT of 001, each P-picture datum has the PCT of 010, and each B-picture datum has the PCT of 011. Accordingly, the I-picture data and the P-picture data are distinguished from the B-picture data by detecting the bit pattern in the PCT. At any rate, each of the I-picture data and the P-picture data has a specific bit pattern in the PCT.

The particular picture detector 15 compares the read datum with the specific bit pattern to determine whether or not the read datum is one of the particular picture data. If the read datum is one of the particular picture data, the particular picture detector 15 supplies the data outputting section 16 with a detection information signal. Responsive to the detection information signal, the data outputting section 16 outputs the read datum as one of the extracted picture data. The extracted picture data are supplied to the variable length decoder 20 (FIG. 3). The address controller 13 increments the current address by an amount of data read to generate the next address which is stored in the address register 12 as a new current address.

The particular picture detector 15 serves as a detecting arrangement for detecting a current particular picture datum in the MPEG video data to obtain a detected result. In other words, the detecting arrangement 15 detects the current particular picture datum in the MPEG video data to produce the detection information signal on detection of the current particular picture datum.

In the manner as described above, the conventional MPEG data processing apparatus sequentially reads all of the MPEG video data from the memory 11 in order to skip the B-picture data although only the I-picture data and the P-picture data are necessitated. In other words, the B-picture data as well as the I-picture data and the P-picture data are read from the memory 11 to the buffer 14. As a result, the conventional MPEG data processing apparatus is disadvantageous in that it takes much time to process the MPEG video data, as mentioned also in the preamble of the instant specification.

Figure 5:
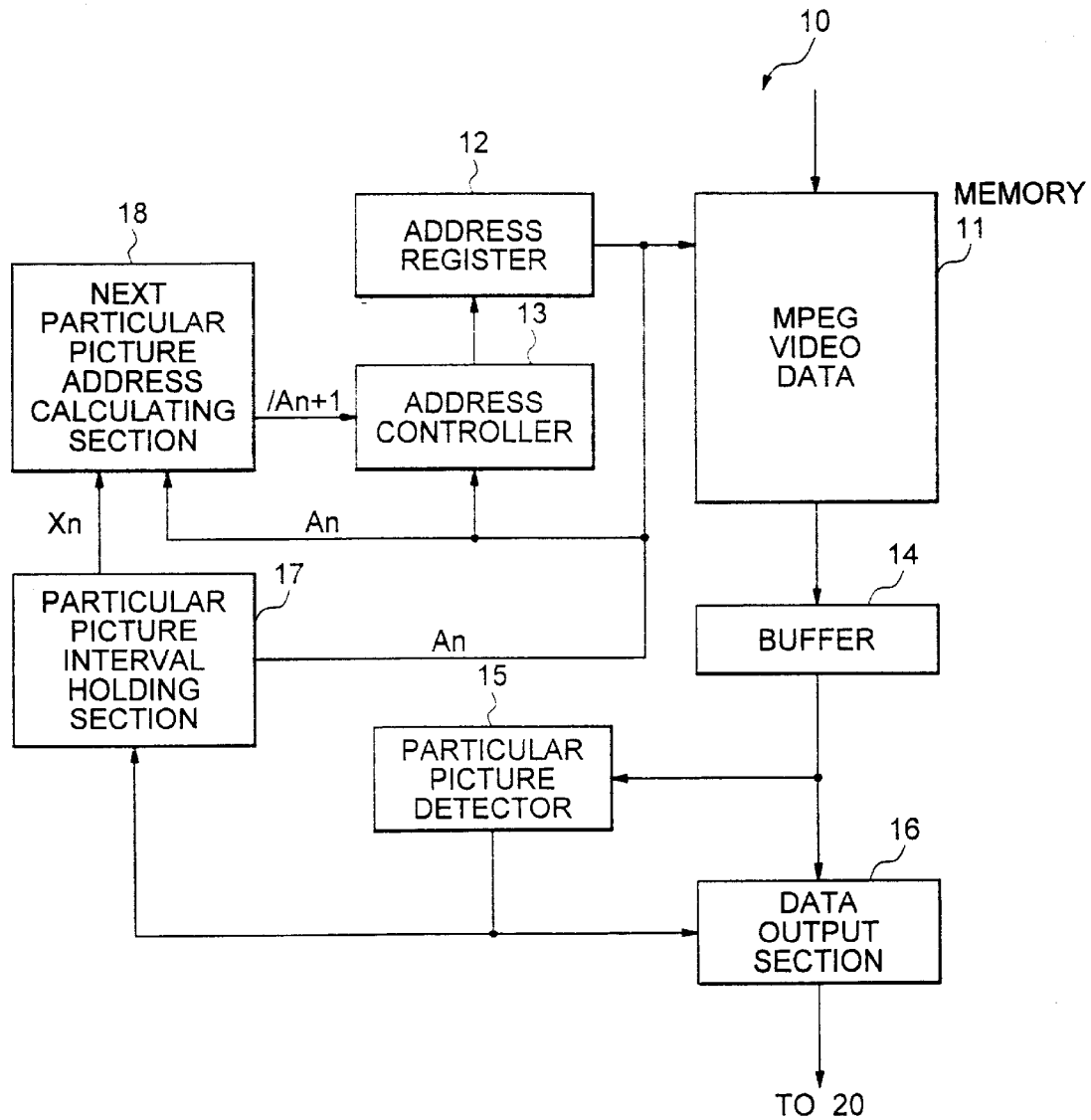
FIG. 5 is a block diagram of a particular picture searching section for use in an MPEG data processing apparatus according to an embodiment of this invention.

Referring to FIG. 5, the description will proceed to a particular picture searching section 10 according to an embodiment of this invention. The particular picture searching section 10 is similar in structure and operation to the conventional particular picture searching section 10' illustrated in FIG. 4 except that the particular picture searching section 10 further comprises a particular picture interval holding section 17 and a next particular picture address calculating section 18.

The particular picture interval holding section 17 is connected to the particular picture detector 15 and the address register 12. In the manner which will later become clear, the particular picture interval holding section 17 holds or estimates, as an estimated interval, an interval between the current particular picture datum and a predicted next particular picture datum in accordance with the detected result. In other words, the particular picture interval holding section 17 acts as an estimating arrangement for estimating, as the estimated interval, the interval on the reception of the detection information signal.

At any rate, a combination of the particular picture detector 15 and the particular picture interval holding section 17 is operable as a first arrangement for detecting the current particular picture datum in the MPEG video data to obtain the detected result and for estimating, as the estimated interval, the current particular picture datum and the predicted next particular picture datum in accordance with the detected result.

The next particular picture address calculating section 18 is connected to the particular picture interval holding section 17, the address register 12, and the address controller 13. In the manner which will later become clear, the next particular picture address calculating section 18 calculates, as an estimated address, an address for the predicted next particular picture datum on the basis of the estimated interval and the current address on reception of the estimated interval to produce the estimated address as a calculated address. The address controller 13 serves as a control arrangement for accessing the memory 11 as the calculated address to make the memory 11 read a datum for the calculated address in the buffer 14.

At any rate, a combination of the next particular picture address calculating section 18 and the address controller 13 acts as a second arrangement for extracting, as one of the extracted picture data, the predicted next particular picture datum in accordance with the estimated interval. In other words, the second arrangement supplies, as the estimated address, the address for the predicted next particular picture datum to the address register 12, thereby reads, as a predicted next extracted picture datum, the predicted next particular picture datum from the memory 11.

Figure 6:
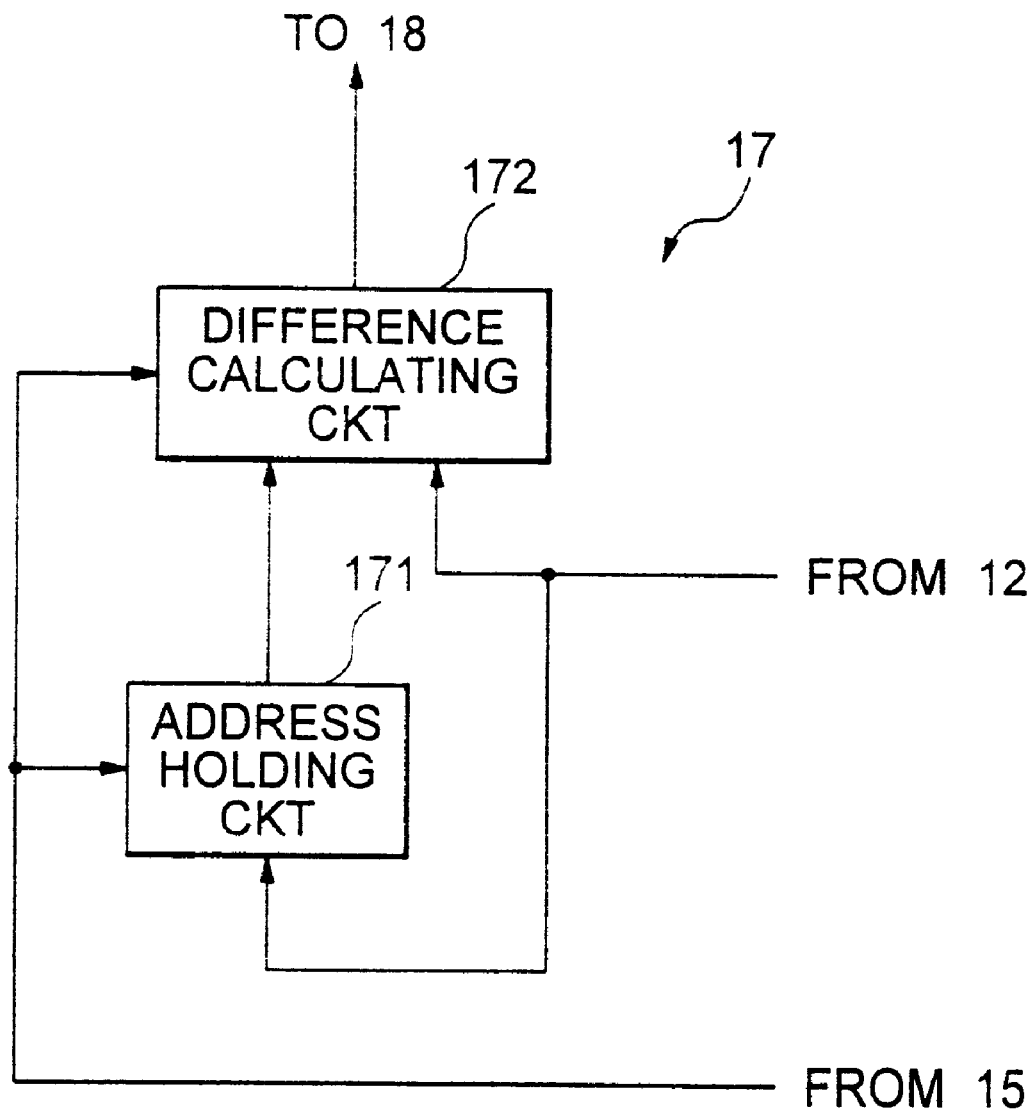
FIG. 6 is a block diagram of a particular interval holding section for use in the particular picture searching section illustrated in FIG. 5.

Turning to FIG. 6, the particular picture interval holding section 17 comprises an address holding circuit 171 and a difference calculating circuit 172.

The address holding circuit 171 is connected to the address register 12 and the particular picture detector 15. Responsive to the detection information signal, the address holding circuit 171 holds, as a held address, an address for a previous particular picture datum.

The difference calculating circuit 172 is connected to the address register 12, the address holding circuit 171, the particular picture detector 15, and the next particular picture address calculating section 18. Responsive to the detection information signal, the difference calculating circuit 172 calculates a difference between the held address and the current address for the current particular picture datum. The difference calculating circuit 172 supplies the next particular picture address calculating section 18 with the difference as the estimated interval.

Referring to FIGS. 5 and 6 in addition to FIG. 2B, description will be made as regards operation of the particular picture searching section 10. It will be assumed that the memory 11 stores the MPEG video data of the GOP layer as illustrated in FIG. 2B. In addition, the MPEG video data illustrated in FIG. 2B has zeroth, first, second, third, and fourth addresses $A_0, A_1, A_2, A_3$, and $A_4$ at the leading edges (the starting addresses) of the first I-picture datum $I_1$, the first P-picture datum $P_1$, the second P-picture datum $P_2$, the second I-picture datum $I_2$, and the third P-picture datum $P_3$, respectively.

Stored in the memory 11, the MPED video data are successively read from the memory 11 to the buffer 14 as the read datum in accordance with the current address stored in the address register 12. The particular picture detector 15 compares the read datum held in the buffer 14 with the specific bit pattern indicative of the I-picture datum or the P-picture datum to determine whether or not the read datum is one of the I-picture data and the P-picture data. When the read datum is one of the I-picture data and the P-picture data, the particular picture detector 15 produces the detection information signal. Responsive to the detection information signal, the date output section 16 outputs the read datum as an output datum.

In the manner known in the art, each picture datum has a starting synchronization code of 32 bits long at a header that is called a picture start code (PSC). Accordingly, it is possible to determine an end of the I-picture datum or the P-picture datum (or a start of the B-picture datum) by detecting the picture start code. Until the picture start code is detected, the current address held in the address register 12 is incremented by the address controller 13 one-by-one. At any rate, one of the I-picture data and the P-picture data is produced by the data output section as one of the extracted picture data.

In addition, when one of the I-picture data and the P-picture data is detected in the particular picture detector 15, the detection information signal is also sent to the particular picture interval holding section 17. Responsive to the detection information signal, the particular picture interval holding section 17 calculates the particular picture interval as follows.

When a first one of the I-picture data and the P-picture data is detected in the particular picture detector 15, the current address held in the address register 12 is held in the address holding circuit 171 as the held address. In the example being illustrated, inasmuch as the first one of the I-picture data and the P-picture data is the first I-picture datum $I_1$, the zeroth address $A_0$ is held in the address holding circuit 171 as the held address. When a second one of the I-picture data and the P-picture data is detected in the particular picture detector 15, the difference calculating circuit 172 of the particular picture interval holding section 17 calculates a difference X1 between the held address $A_0$ and the current address $A_1$ to produce the difference X1 as the estimated interval. In addition, in order to calculate the next interval, the address holding circuit 171 of the particular picture interval holding section 17 holds the current address $A_1$ as a new held address.

Calculated in the manner which is described above, the estimated interval X1 is supplied from the particular picture interval holding section 17 to the next particular picture address calculating section 18. The next particular picture address calculating section 18 calculates, a calculated address, the predicted next particular address/$A_2$ on the basis of the current address $A_1$ held in the address register 12 and the estimated interval X1 calculated in the particular picture interval holding section 17. The next particular picture address calculating section 18 supplies the address controller 13 with the calculated address/$A_2$. In this event, the next particular picture address calculating section 18 generally calculates the calculated address/$A_{n+1}$ by subtracting a predetermined value $\alpha$ from a sum $(A_n+Xn)$ of the current address $A_n$ and the estimated interval Xn, namely, $$/A_{n+1}=A_n+Xn-\alpha.$$

where n represents a positive integer. This is because the sum $(A_n+Xn)$ may get ahead of the true next particular picture address $A_{n+1}$ in a case where the next picture interval Xn+1 is shorter than the estimated interval Xn. Accordingly, the calculated address/$A_{n+1}$ always becomes smaller than the true next particular picture address $A_{n+1}$, namely, $$/A_{n+1}<A_{n+1}.$$

It is therefore possible to prevent the calculated address/$A_{n+1}$ from getting ahead of the true next particular picture address $A_{n+1}$. In other words, the next picture interval Xn+1 is larger than a value $(Xn-\alpha)$ obtained by subtracting the predetermined value $\alpha$ from the estimated interval Xn, namely, $$Xn+1>Xn-\alpha.$$

In a normal state, the address controller 13 increments the current address by an amount of data read to generate the next address and stores the next address in the address register 12 as the new current address. On the other hand, when any one of the I-picture data and the P-picture data is detected in the particular picture detector 15 or on reception of the calculated address/$A_{n+1}$, the address controller 13 stores the calculated address/$A_{n+1}$ in the address register 12 after all of the any one of the I-picture data and the P-picture data are read from the memory 11 to the buffer 14. Thereafter, the address controller 13 carries out normal address increment.

In the manner which is described above, a searching method according to this invention comprising the steps of estimating, as an estimated particular picture interval, a next particular picture interval between a current particular picture datum and a predicted next particular picture datum using a past particular picture interval between the current particular picture datum and a previous particular picture datum, and of extracting the predicted next particular picture datum from the MPEG video data on the basis of the estimated particular picture interval. As a result, it is possible to search the MPEG video data for only the I-picture data and the P-picture data at a high speed without sequentially reading all of the MPEG video data from the memory 11 to the buffer 14.

While this invention has thus far been described in conjunction with a preferred embodiment thereof, it will now be readily possible for those skilled in the art to put this invention into various other manners. For example, although the particular picture interval holding section 17 calculates the estimated interval on the basis of the address difference between the held address and the current address, the particular picture interval holding section 17 may calculates the estimated interval by using other techniques. For example, the particular picture interval holding section 17 may comprise a counter which is reset on detection of the particular picture datum and which counts an amount of data until the counter is reset and the particular picture interval holding section 17 may calculate the estimated interval on the basis of the counted amount of data. That is, the particular picture interval holding section 17 may use a counted value in the counter as the estimated interval.

In addition, although the next particular picture address calculating section 18 calculates the calculated address using the predetermined value, a set value may be set in the next particular picture address calculating section 18 from external as needed. In this event, it is possible to change the set value from the external in some situations and it is possible to carry out control in more detail.

What is claimed is:

1. A moving picture coding experts group (MPEG) data processing apparatus for successively extracting, as extracted picture data, particular picture data from MPEG video data to obtain original picture data from said extracted picture data, said MPEG data processing apparatus comprising:

first means for detecting a current particular picture datum in said MPEG video data to obtain a detected result, said first means estimating, as an estimated interval, an interval between the current particular picture datum and a predicted next particular picture datum in accordance with said detected result; and second means, connected to said first means, for extracting, as a predicted one of the extracted picture data, the predicted next particular picture datum in accordance with the estimated interval.

2. The MPEG data processing apparatus as claimed in claim 1, said MPEG video data including intra coded picture data, predictive coded picture data, and bidirectionally predictive picture data, wherein said particular picture data comprise said intra coded picture data and said predictive coded picture data.

3. The MPEG data processing apparatus as claimed in claim 1, said first means comprising:

detecting means for detecting said current particular picture datum in said MPEG video data to produce a detection information signal on detection of said current particular picture datum; and estimating means, connected to said connecting means, for estimating as the estimated interval, the interval on reception of the detection information signal.

4. The MPEG data processing apparatus as claimed in claim 3, said MPEG data processing apparatus comprising a memory for storing said MPEG video data at successive addresses and an address register for holding a current address for said memory, said second means supplying, as an estimated address, an address for the predicted next particular picture datum to said address register, thereby reading, as a predicted next extracted picture datum, the predicted next particular picture datum from said memory.

5. The MPEG data processing apparatus as claimed in claim 4, said MPEG data processing apparatus further comprising a buffer for holding, as a read datum, a datum read out of said memory at the current address, wherein said detecting means detects said current particular picture datum in the read datum, said second means comprising:

address calculating means, connected to said estimating means and said address register, for calculating said estimated address on the basis of the estimated interval and the current address on reception of the estimated interval to produce the estimated address as a calculated address; and control means, connected to said address calculating means and said address register, for accessing said memory at the calculated address to make said memory read a datum for the calculated address in said buffer.

6. The MPEG data processing apparatus as claimed in claim 5, wherein said estimating means comprises:

address holding means, connected to said detecting means and said address register, said address holding means holding an address for a previous particular picture datum; and difference calculating means, connected to said address holding means, said detecting means, said address register, and said address calculating means, for calculating a difference between the held address and the current address for the current particular picture datum, said difference calculating means supplying said address calculating means with the difference as the estimated interval.

7. A particular picture searching section for searching moving picture coding experts group (MPEG) video data for particular picture data, said particular picture searching section comprising:

first means for detecting a current particular picture datum in said MPEG video data to obtain a detected result, said first means estimating, as an estimated interval, an interval between the current particular picture datum and a predicted next particular picture datum in accordance with said detected result; and second mean, connected to said first means, for extracting, as a predicted one of the particular picture data, the predicted next particular picture datum in accordance with the estimated interval.

8. The particular picture searching section as claimed in claim 7, said MPEG video data including intra coded picture data, predictive coded picture data, and bidirectionally predictive picture data, wherein said particular picture data comprise said intra coded picture data and said predictive coded picture data.

9. The particular picture searching section as claimed in claim 7, said first means comprising:

detecting means for detecting said current particular picture datum in said MPEG video data to produce a detection information signal on detection of said current particular picture datum; and estimating means, connected to said detecting means, for estimating, as the estimated interval, the interval on reception of the detection information signal.

10. The particular picture searching section as claimed in claim 9, said particular picture searching section comprising a memory for storing said MPEG data at successive addresses and an address register for holding a current address for said memory, said second means supplying, as an estimated address, an address for the predicted next particular picture datum to said address register, thereby reading, as a predicted next extracted picture datum, the predicted next particular picture datum from said memory.

11. The particular picture searching section as claimed in claim 10, said particular picture searching section further comprising a buffer for holding, as a held datum, a datum read out of said memory at the current address, wherein said detecting means detects said current particular picture datum in the held datum, said second means comprising:

address calculating means, connected to said estimating means and said address register, for calculating said estimated address on the basis of the estimated interval and the current address on reception of the estimated interval to produce the estimated address as a calculated address; and control means, connected to said address calculating means and said address register, for accessing said memory at the calculated address to make said memory read a datum for the calculated address in said buffer.

12. The particular picture searching section as claimed in claim 11, wherein said estimating means comprises:

address holding means, connected to said detecting means and said address register, for holding a held address, an address for a previous particular picture datum; and difference calculating means, connected to said address holding means, said detecting means, said address register, and said address calculating means, said difference calculating means calculating a difference between the held address and the current address for the current particular picture datum, said difference calculating means supplying said address calculating means with the difference as the estimated interval.

13. A method of successively searching moving picture coding experts group (MPEG) video data for particular picture data, said method comprising the steps of:

estimating, and estimated particular picture interval, a next particular picture interval between a current particular picture datum and a predicted next particular picture datum using a past particular picture interval between the current particular picture datum and a previous particular picture datum; and extracting the predicted next particular picture datum from said MPEG video data on the basis of the estimated particular picture interval.

* * * * *